Figure 1:
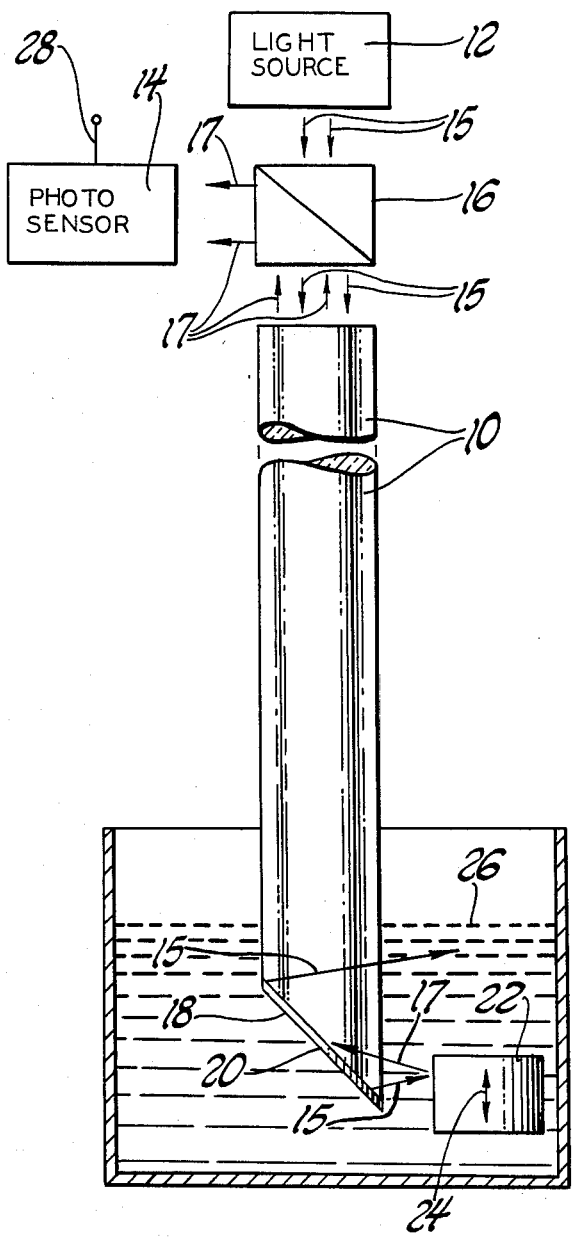

United States Patent [19]

Bertollini

[11] Patent Number: 4,624,570

[45] Date of Patent: Nov. 25, 1986

[54] FIBER OPTIC DISPLACEMENT SENSOR

[75] Inventor: Gary P. Bertollini, Mt. Clemens, Mich.

[73] Assignee: General Motors Corporation, Detroit, Mich.

[21] Appl. No.: 646,147

[22] Filed: Aug. 31, 1984

[51] Int. Cl.[4] .............................................. G01B 11/14
[52] U.S. Cl. ..................................... 356/373; 356/375
[58] Field of Search ................................. 356/373, 375

[56] References Cited

U.S. PATENT DOCUMENTS 4,381,882  5/1983  Sabine ................................. 350/96.2
4,403,273  9/1983  Nishioka ............................... 362/32

FOREIGN PATENT DOCUMENTS 0179606  11/1982  Japan .................................... 356/373
0052503   3/1983  Japan .................................... 356/373

OTHER PUBLICATIONS

"Plastic Optical Fiber Displacement Sensor for Study of the Dynamic Response of a Solid Exposed to an Intense Pulsed Electron Beam" Bailey–Sans, *Review of Scientific Instruments*, vol. 46, #7, pp. 879–882, Jul. 1975.

Primary Examiner—R. A. Rosenberger
Assistant Examiner—Crystal D. Cooper
Attorney, Agent, or Firm—Warren D. Hill

[57] ABSTRACT

At least one fiber optic light conductor extends from a source and detection area to a measurement area. In the measurement area, the fiber end is prepared with an end surface slanted relative to the fiber axis and the slanted surface is coated with a reflective material so that light conducted through the fiber is reflected from the end surface and through the side wall of the fiber onto an object being measured. Light is reflected from the object in an amount depending upon the position of the object and reflected light is carried through a similar path by the same or a similar optical fiber to the detector, such that the detector signal correlates to the position of the object.

3 Claims, 2 Drawing Figures

FIBER OPTIC DISPLACEMENT SENSOR

This invention relates to a displacement sensor and more particularly to displacement sensors utlizing fiber optics.

It is often required to sense the position or displacement of an object in a location where there is extremely limited space for instrumentation. Such sensing may be required in locations subject to temperature extremes and in the presence of various types of liquids. Fiber optic sensors have been useful under adverse operating conditions, however, they sometimes require special fittings such as prisms, mirrors, or lenses which are bulky and thus incompatible with limited space restrictions.

It is therefore a general object of the invention to provide a fiber optic displacement sensor suitable for regions of limited space for instrumentation.

The invention is carried out by a displacement sensor having one or more optical fibers extending from a light source and a detector to a measurement area where they each terminate in a slanted end surface which is coated with a reflective material to reflect light transmitted from the light source through the fiber side walls toward the object to be sensed and to reflect light received from the object for transmission to a light detector, where the light intensity is a function of the position of the object.

Figure 2:
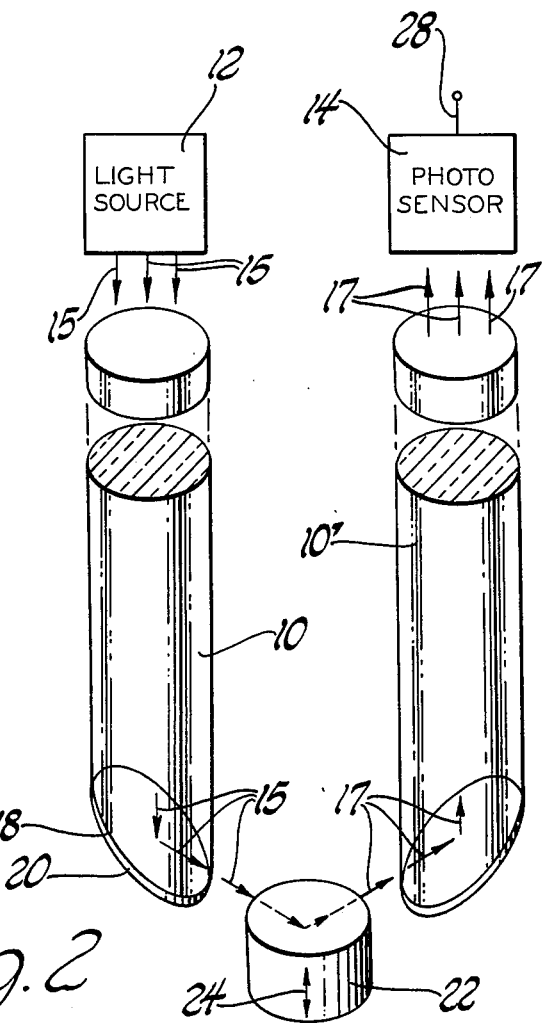

The above and other advantages are apparent from the following description taken with the accompanying drawings wherein like reference numerals refer to like elements and wherein, FIG. 1 is a schematic elevational view of one embodiment of a fiber optic displacement sensor according to the invention; and FIG. 2 is a schematic isometric view of another embodiment of a fiber optic displacement sensor according to the invention.

Referring to FIG. 1, a conventional type of optical fiber 10, for example, one having a glass core and a thin coating (not shown) of higher index of refraction material has an upper end adjacent to a light source 12 and a photo sensor or detector 14. A directional coupler 16 couples light indicated by arrows 15 from the source 12 into the fiber 10 and couples light indicated by arrows 17 from the fiber 10 to the photo sensor 14. The opposite end of the optical fiber has an end surface 18 slanted at an angle of 45° to the axis of the fiber. That surface is coated with a film 20 of reflective material. An object 22 adjacent the end surface 18 of the optical fiber 10 is movable in a direction parallel to the fiber axis as indicated by the double arrow 24, so that its interaction with the optical path of light from the source 12 is a function of displacement. The object 22 and at least the lower portion of the fiber 10 is immersed in a body 26 of liquid such as water or oil.

In operation, light from the source 12 is directed through the optical fiber 10 to the lower end where it is reflected from the slanted surface 18 out through the side wall of the fiber towards the object 22 as shown by arrows 15. Since light striking the fiber wall at or near normal incidence is not internally reflected, it effectively passes through the fiber wall. Light reflected back from the object 22 shown by arrows 17 re-enters the side wall of the fiber and is reflected from the slanted surface 18 and transmitted through the optical fiber and the directional coupler 16 to the photo sensor 14. An output line 28 of the photo sensor carries an electrical signal proportional to the illumination intensity received by the photo sensor. That intensity depends upon the amount of light reflected into the optical fiber 10 from the object 22 and thus is a function of the position or displacement of the object 22. Any reflective feature on the object 22 can reflect light back into the fiber if it is in a region illuminated by light from the fiber but, should the object move parallel to the fiber to a position outside the illuminated region, no light can be reflected back. During such an excursion of the object, the efficiency or degree of light return to the fiber 10 reflection will vary over a range between zero and a maximum in accordance with the position of the object 22. Of course, the amount of light reflected back depends upon the reflectivity and geometry of the object 22, its spacing from the end of the fiber 10 and the nature of the medium between the optical fiber 10 and the object 22. For a given set of conditions, the sensor can be calibrated to correlate the output signal on line 28 of the photo sensor with the position of the object 22.

In FIG. 2, two optical fibers 10 and 10', identical in structure to the optical fiber of FIG. 1, are utilized. The fiber 10 receives light (shown by arrows 15) directly from the light source 12 and emits light at its lower end through the fiber side wall to illuminate the object 22 which is displaceable in a direction parallel to the axes of the fibers. The object is illuminated at its rear side as viewed in FIG. 2. The fiber 10' receives light reflected from the object 22 and carries that light (shown by arrows 17) to the photo sensor 14. The operation of this embodiment is the same as that of FIG. 1 except that each optical fiber carries light in only one direction (except for incidental reflections) and the coupling to and from the sensor and source is simplified. The sensor of this embodiment may also be wholly or partially immersed in fluid like that of FIG. 1. An alternative use of a dual fiber configuration is to transmit the light directly between the ends of fiber 10 and fiber 10' and position the object 22 so that some portion of the object interrupts light transmission between the two fibers. The resulting light attenuation is determined by the object displacement.

A specific proposal for utilization of the fiber optic displacement sensor is for valve lift detection in a diesel fuel injector. In that case, the object 22 represents the valve needle and the photo sensor output on line 28 corresponds to the needle lift position. To simulate that measurement the arrangement of FIG. 2 was used. Optical fibers 10, 10' one millimeter in diameter were prepared by forming the lower ends at approximately a 45° angle and sputtering a platinum coating 20 onto the end surfaces 18. The resulting instrument works well in diesel fuel as well as water and oil.

It will thus be seen that the fiber optic displacement sensor according to the invention is suitable for insertion into very small spaces and is operable over a wide range of temperatures and many types of fluid.

The embodiments of the invention in which an exclusive property of privilege is claimed are defined as follows:

1. A fiber optic displacement sensor for monitoring displacement of an object parallel to the optical fiber axis comprising, light source and detector means, optical fiber means extending from the light source and detector means to a position adjacent the object being monitored, the optical fiber means having an end treatment including a fiber end surface slanted with respect to the fiber axis and coated with reflective material so that the path of light transmitted to the object from the source is reflected from the slanted end surface and directed laterally through a wall of the fiber means towards the object and the light is attenuated by the object as a function of the object position and returned along a similar light path to the detector means, the light intensity received at the detector means being a measure of the object position in the light path.

2. A fiber optic displacement sensor for measuring displacement of an object parallel to the optical fiber axis comprising;

a light source and a detector;

an optical fiber extending from the light source and detector to a measurement location, means for coupling light from the source into an end of the fiber and for coupling light from the same end of the fiber to the detector, a reflective object at the measurement location adjacent the optical fiber for movement parallel to the optical fiber axis, means for coupling light laterally from the optical fiber to the object and receiving light reflected from the object including an optical fiber end surface slanted with respect to the fiber axis and coated with reflective material to direct the light path through the wall of the fiber, whereby light emitted through the wall illuminates the object and light reflected from the object is received through the wall and conducted to the detector where the measured light is a function of the object position in the light path.

3. A fiber optic displacement sensor for measuring displacement of an object parallel to the optical fiber axis comprising;

a light source and a light detector first and second optical fibers coupled to the light source and the light detector respectively and extending to a position adjacent the object being monitored, an end treatment of each fiber at its end adjacent the object comprising the fiber end surface slanted with respect to the fiber axis and coated with reflective material so that light transmitted from the source through the first fiber is reflected from the respective slanted end surface and through the fiber wall toward the object, and light reflected from the object in accordance with the object position is directed through the second fiber wall and reflected from the respective slanted end surface for coupling to the detector, the detected light intensity being a measure of the object position relative to the fiber end surfaces.

* * * * *